(12) United States Patent
Chen et al.

(10) Patent No.: US 6,822,575 B2
(45) Date of Patent: Nov. 23, 2004

(54) BACKFILL PREVENTION SYSTEM FOR GAS FLOW CONDUIT

(75) Inventors: Wen-Ming Chen, Miaoli (TW); Wen-Chi Wang, Chu-Nan (TW); Ming-Shong Fu, Hsin-Chu (TW); Jing-Hou Chen, Miaoli (TW)

(73) Assignee: Taiwan SEmiconductor Manufacturing, Co., Ltd, Hsin Chu (TW)

( * ) Notice: Subject to any disclaimer, the term of this patent is extended or adjusted under 35 U.S.C. 154(b) by 0 days.

(21) Appl. No.: 10/202,689

(22) Filed: Jul. 25, 2002

(65) Prior Publication Data

US 2004/0017297 A1 Jan. 29, 2004

(51) Int. Cl.[7] ............................................. G08B 21/00
(52) U.S. Cl. ........................ 340/606; 340/603; 137/2
(58) Field of Search ............................... 340/603, 606; 137/2, 455, 468, 470

(56) References Cited

U.S. PATENT DOCUMENTS 4,137,710 A * 2/1979 Preti et al. ................... 60/223
5,719,341 A * 2/1998 Reynolds et al. ........ 73/861.92

FOREIGN PATENT DOCUMENTS

JP  403113208 A * 5/1991
JP  11108730 A * 4/1999

* cited by examiner

Primary Examiner—Julie Lieu
(74) Attorney, Agent, or Firm—Tung & Associates

(57) ABSTRACT

A backfill prevention system for a gas flow conduit, comprising a gas flow monitor circuit which measures the rate and direction of gas flow through a gas flow conduit and converts the measured data into a voltage signal. A valve control circuit operably connected to a valve or valves in the gas flow conduit receives the voltage signal from the gas flow monitor circuit and closes the valve or valves in the event that the voltage signal indicates backflow of a gas through the gas flow conduit. The valve control conduit may further be provided with a first light emitting diode (LED) which is illuminated during normal flow of the gas through the conduit, and a second LED which is illuminated in the event of gas backflow through the conduit. The system is typically used in conjunction with a mass flow controller in the conduit.

16 Claims, 2 Drawing Sheets

BACKFILL PREVENTION SYSTEM FOR GAS FLOW CONDUIT

FIELD OF THE INVENTION

The present invention relates to mass flow controllers which control the flow of process gases into a process chamber in the fabrication of integrated circuits on semiconductor wafers in the chamber. More particularly, the present invention relates to a backfill prevention system which may be operated in conjunction with a mass flow controller to measure flow of gas through a gas flow conduit and close a valve or valves in the conduit as needed to prevent gas backfilling of the conduit.

BACKGROUND OF THE INVENTION

The fabrication of various solid state devices requires the use of planar substrates, or semiconductor wafers, on which integrated circuits are fabricated. The final number, or yield, of functional integrated circuits on a wafer at the end of the IC fabrication process is of utmost importance to semiconductor manufacturers, and increasing the yield of circuits on the wafer is the main goal of semiconductor fabrication. After packaging, the circuits on the wafers are tested, wherein non-functional dies are marked using an inking process and the functional dies on the wafer are separated and sold. IC fabricators increase the yield of dies on a wafer by exploiting economies of scale. Over 1000 dies may be formed on a single wafer which measures from six to twelve inches in diameter.

Various processing steps are used to fabricate integrated circuits on a semiconductor wafer. These steps include deposition of a conducting layer on the silicon wafer substrate; formation of a photoresist or other mask such as titanium oxide or silicon oxide, in the form of the desired metal interconnection pattern, using standard lithographic or photolithographic techniques; subjecting the wafer substrate to a dry etching process to remove the conducting layer from the areas not covered by the mask, thereby etching the conducting layer in the form of the masked pattern on the substrate; removing or stripping the mask layer from the substrate typically using reactive plasma and chlorine gas, thereby exposing the top surface of the conductive interconnect layer; and cooling and drying the wafer substrate by applying water and nitrogen gas to the wafer substrate. Many of the various processing steps, including but not limited to etching and chemical vapor deposition (CVD), used in the semiconductor fabrication process require process fluids or chemicals for the formation of integrated circuits on the wafer substrate.

About 50 different types of gases are used in as many as 450 process steps in semiconductor manufacturing. Gases used in semiconductor fabrication are generally categorized as one of two types: bulk gases, which include oxygen, nitrogen, helium and argon; and specialty gases, which include chlorine and hydrogen chloride and are the process gases used to effect the circuit-fabricating chemical reactions on the semiconductor wafer substrate. Bulk gases, which include purge gases used to flush undesirable residual gases, atmospheric gases or water vapor from a process chamber, are stored in large storage tanks outside the wafer fab manufacturing area and are distributed into the proper workstation through a bulk gas distribution (BGD) system. Specialty gases are dispensed from cylinders in a gas cylinder cabinet containing a control panel. A local gas distribution system in the process area is used to deliver the gas from the cylinder to the chamber of the process tool.

The molecular quantities of the reactant gases utilized in semiconductor fabrication processes are important for proper control of the reactions. According to the ideal gas law, the number of gas molecules contained in a given volume changes in proportion to to the absolute pressure and temperature. Therefore, a given volume of gas flowing into a process chamber yields various quantities of gas molecules depending on the temperature and pressure of the gas. Accordingly, mass flow controllers (MFCs), which utilize a thermal sensor that senses the heat-transfer property of a gas to detect changes in the mass flow of the gas, are used to control the flow of gases into process chambers.

A typical conventional gas delivery system in a semiconductor fab facility is generally indicated by reference numeral 10 in FIG. 1 and includes a gas manifold 12 connected to a process chamber 40 of a process tool (not shown) in the facility. The gas manifold 12 may be contained in a valve manifold box (VMB, not shown) and includes a $BCl_3$ gas delivery conduit 14 for conducting $BCl_3$ to the process chamber 40, a $Cl_2$ gas delivery conduit 15 for conducting $Cl_2$ to the process chamber 40, an $N_2S$ gas delivery conduit 16 for conducting $N_2S$ to the process chamber 40, a $CH_3F$ gas delivery conduit 17 for conducting $CH_3F$ to the process chamber 40, and a $CF_4$ gas delivery conduit 18 for conducting $CF_4$ to the process chamber 40. The $BCl_3$ and the $Cl_2$ are each delivered to the process chamber 40 typically at a pressure of about 15 psi, whereas the $N_2S$, the $CH_3F$ and the $CF_4$ are delivered to the process chamber 40 typically at a pressure of about 35 psi. Each of the gas flow lines 14–18 is typically fitted with a manual valve 20 for manually opening and closing the corresponding gas flow line; a regulator 24 for controlling the gas pressure in the gas flow line; a filter 26 for filtering particles from the flowing gas; a mass flow controller (MFC) 30 for controlling the flow rate of each gas in the corresponding gas delivery conduit; and an upstream valve 28 and a downstream valve 32 on respective sides of the mass flow controller 30. The gas delivery conduits are connected to a common manifold conduit 34, from which an outlet conduit 36 conducts the gases into the process chamber 40. A final valve 38 is provided in the outlet conduit 36. The lower-pressure gas delivery conduits 14 and 15 may each be fitted with a V-block valve 22 which prevents backflow of gas through the respective gas delivery conduits.

One of the problems associated with the conventional gas delivery system 10 is that the final valve 38 frequently becomes blocked or clogged during use and is therefore incapable of opening to establish fluid communication between the manifold conduit 34 and the process chamber 40. Consequently, residual gas from the higher-pressure gas delivery conduits 16–18, such as the $N_2S$, the $CH_3F$ or the $CF_4$, respectively, remains in the manifold conduit 34 after flow of these gases to the process chamber 40. Accordingly, upon subsequent flow of the lower-pressure $BCl_3$ to the process chamber 40 through the gas delivery conduit 14, the upstream valve 28 and downstream valve 32 are each opened and the higher-pressure $CH_3F$ or $CF_4$ backflows from the manifold conduit 34 and through the downstream valve 32, the mass flow controller 30 and the upstream valve 28, respectively, of the $BCl_3$ gas delivery conduit 14. This gas backfill causes contamination of the $BCl_3$ gas delivery conduit 14 with the $CH_3F$ or the $CF_4$ gas, thereby potentially adversely affecting processes carried out in process tools connected to the valve manifold box in which the gas manifold 12 is contained. Additionally, clearing of the $CH_3F$ or $CF_4$ gas from the $BCl_3$ gas delivery conduit 14 results in unnecessary downtime in the semiconductor processing sequence.

Accordingly, an object of the present invention is to provide a system which prevents undesired backfilling of a gas flow conduit with a gas.

Another object of the present invention is to provide a backfill prevention system which prevents gas contamination of a gas flow conduit.

Still another object of the present invention is to provide a backfill prevention system which is capable of closing a valve or valves in a gas flow conduit to prevent backfilling of the conduit with an undesired gas.

Yet another object of the present invention is to provide a backfill prevention system which prevents undesired gas contamination of a process tool for semiconductors.

A still further object of the present invention is to provide a backfill prevention system which eliminates downtime associated with clearing gas from a gas flow conduit in a semiconductor fab facility.

Yet another object of the present invention is to provide a backfill prevention system which is capable of a variety of industrial applications.

Another object of the present invention is to provide a backflow prevention system which utilizes a negative voltage signal that corresponds to reverse flow of gas in a gas flow conduit to close valves in the gas flow conduit and prevent gas backfill or contamination of the conduit.

Yet another object of the present invention is to provide a backfill prevention system which may be utilized with a mass flow controller to sense backfilling of gas in a gas flow conduit and close valves in the conduit to prevent further backfilling of the gas in the conduit.

SUMMARY OF THE INVENTION

In accordance with these and other objects and advantages, the present invention comprises a backfill prevention system for a gas flow conduit, comprising a gas flow monitor circuit which measures the rate and direction of gas flow through a gas flow conduit and converts the measured data into a voltage signal. A valve control circuit operably connected to a valve or valves in the gas flow conduit receives the voltage signal from the gas flow monitor circuit and closes the valve or valves in the event that the voltage signal indicates backflow of a gas through the gas flow conduit. The valve control conduit may further be provided with a first light emitting diode (LED) which is illuminated during normal flow of the gas through the conduit, and a second LED which is illuminated in the event of gas backflow through the conduit. The system is typically used in conjunction with a mass flow controller in the conduit.

BRIEF DESCRIPTION OF THE DRAWINGS

The invention will now be described, by way of example, with reference to the accompanying drawings, in which.

DESCRIPTION OF THE PREFERRED EMBODIMENTS

The present invention has particularly beneficial utility in gas delivery conduits of gas delivery systems used in the distribution of gases to process chambers in a semiconductor fabrication facility. However, the invention is not so limited in application, and while references may be made to such gas delivery systems used in the semiconductor fabrication industry, the invention is more generally suitable for gas flow conduits used in a variety of industrial and mechanical applications.

Figure 1:
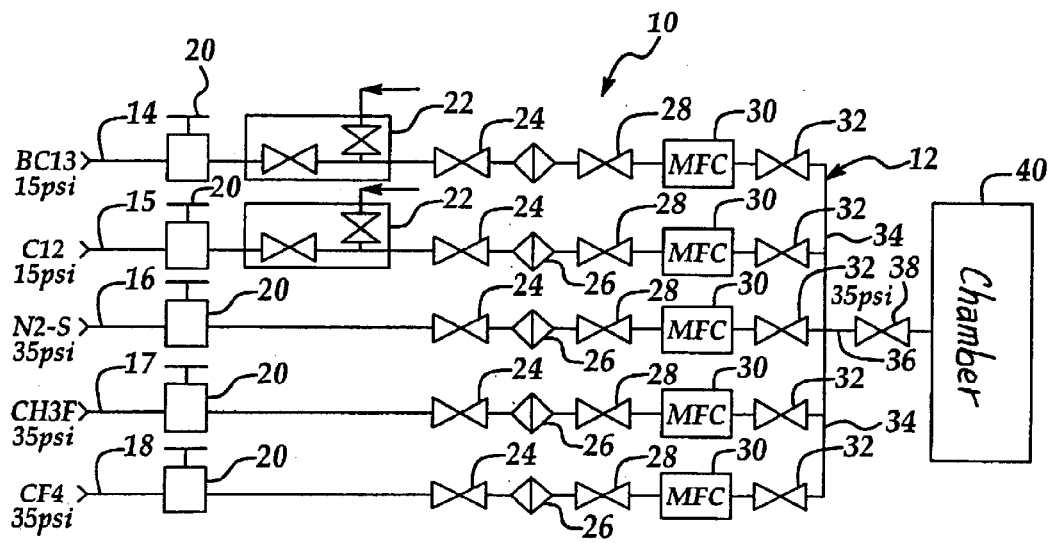
FIG. 1 is a schematic view of a typical conventional gas delivery system for delivering gases to a process chamber in a semiconductor fab facility.
Figure 2:
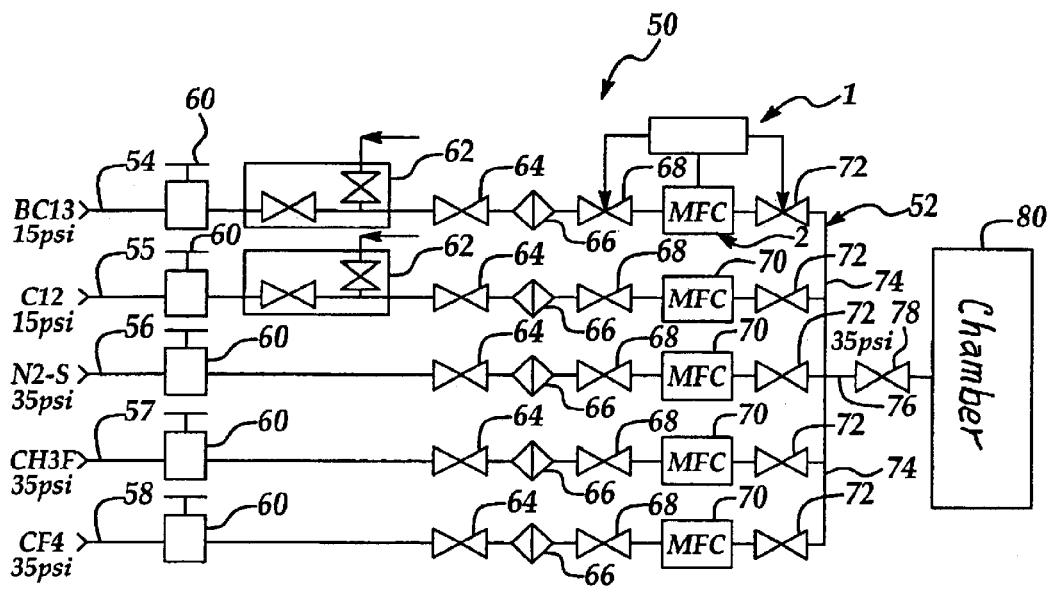
FIG. 2 is a schematic view of a gas delivery system in implementation of the backfill prevention system of the present invention.

An illustrative embodiment of the backfill prevention system of the present invention is generally indicated by reference numeral 1 in FIG. 2 and is typically used as part of a gas delivery system 50 for delivering various gases to a process chamber 80 of a process tool (not shown) in a semiconductor manufacturing facility. The gas delivery system 50 may include a gas manifold 52 connected to the process chamber 80 in the facility. The gas manifold 52 may be contained in a valve manifold box (VMB, not shown) and typically includes a $BCl_3$ gas delivery conduit 54 for conducting $BCl_3$ to the process chamber 80, a $Cl_2$ gas delivery conduit 55 for conducting $Cl_2$ to the process chamber 80, an $N_2S$ gas delivery conduit 56 for conducting $N_2S$ to the process chamber 80, a $CH_3F$ gas delivery conduit 57 for conducting $CH_3F$ to the process chamber 80, and a $CF_4$ gas delivery conduit 58 for conducting $CF_4$ to the process chamber 80. It will be recognized and understood that various other gases in addition to or other than those mentioned above may be delivered to the process chamber 80 through the gas delivery conduits. The $BCl_3$ and the $Cl_2$ are each delivered to the process chamber 80 typically at a pressure of about 15 psi, whereas the $N_2S$, the $CH_3F$ and the $CF_4$ are delivered to the process chamber 80 typically at a pressure of about 35 psi. Each of the gas flow lines 54–58 is typically fitted with a manual valve 60 for manually opening and closing the corresponding gas flow line; a regulator 64 for controlling the gas pressure in the gas flow line; a filter 66 for filtering particles from the flowing gas; and an upstream valve 68 and a downstream valve 72. The upstream valve 68 and the downstream valve 72 are typically electric solenoid valves. A mass flow controller (MFC) 70 for controlling the flow rate of each gas in the corresponding gas delivery conduit 55–58. A MFC 2, which may be modified according to the present invention, is provided in the $BCl_3$ gas delivery conduit 54 for controlling the flow rate of the $BCl_3$ therethrough. The gas delivery conduits 54–58 are connected to a common manifold conduit 74, from which an outlet conduit 76 conducts the gases into the process chamber 80. A final valve 78 is provided in the outlet conduit 76. The lower-pressure $BCl_3$ gas delivery conduit 54 and $Cl_2$ gas delivery conduit 55 may each be fitted with a V-block valve 62 which prevents backflow of gas through the respective gas delivery conduits 54 and 55.

Figure 3:
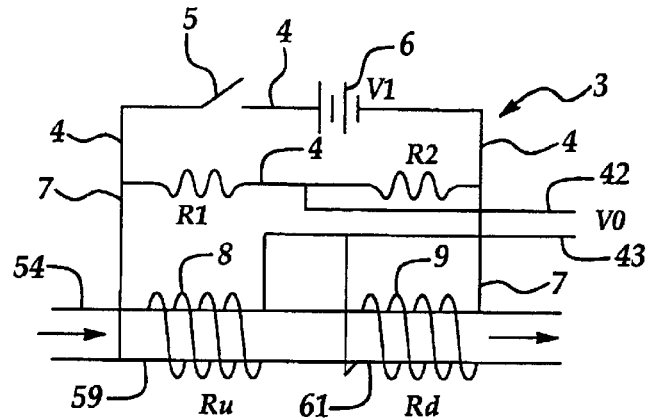
FIG. 3 is a schematic wiring diagram illustrating a typical gas flow monitor circuit in implementation of the present invention.

The backfill prevention system 1 includes a thermal-sensing gas flow monitor circuit 3 (FIG. 3) which may be a part of the mass flow controller 2 (FIG. 2) of the $BCl_3$ gas delivery conduit 54. Alternatively, the gas flow monitor circuit 3 may be separate from the mass flow controller 2. The gas flow monitor circuit 3 includes a switch 5, a voltage source 6, an upstream thermal induction coil 8, and a downstream thermal induction coil 9 which are coiled around an upstream portion 59 and a downstream portion 61, respectively, of the $BCl_3$ gas delivery conduit 54 of the gas delivery system 50. The upstream thermal induction coil 8 and the downstream thermal induction coil 9 use the heat-transfer property of the gas flowing through the gas delivery conduit 54 to measure the mass flow rate of the gas in the gas delivery conduit 54, in the same manner as conventional mass flow controllers. The gas flow monitor circuit 3 further includes a first resistor (R1) and a second resistor (R2) in series. A primary voltage signal lead 42 leads from the circuit 3 between the first resistor R1 and the second resistor R2. A secondary voltage signal lead 43 leads from the upstream thermal induction coil 8 and the downstream thermal induction coil 9. Accordingly, when the switch 5 is closed, current having a voltage V1 flows along a current path 4 through the first resistor R1 and the second resistor R2. Some of the current flows through the primary voltage signal lead 42, and some of the current flows along a current path 7 through the upstream induction coil 8, the downstream induction coil 9 and the secondary voltage signal lead 43. V0 defines the voltage potential between the primary voltage signal lead 42 and the secondary voltage signal lead 43. Depending on the rate of flow of $BCl_3$ gas through the $BCl_3$ gas delivery conduit 54 at the upstream portion 59 and the downstream portion 61 of the $BCl_3$ gas delivery conduit 54, V0 has various values. The relationship between V0 and these values is expressed by the formula Vo=V1*[(Rd−Ru)/(Rd+Ru)], where Ru=the flow rate of $BCl_3$ flowing through the upstream portion 59 of the $BCl_3$ gas delivery conduit 54 and Rd=the flow rate of $BCl_3$ flowing through the downstream portion 61 of the $BCl_3$ gas delivery conduit 54. Accordingly, when the rate of $BCl_3$ flow through the $BCl_3$ gas delivery conduit 54 is constant, Rd=Ru and V0=0. When the $BCl_3$ flow rate increases, Rd>Ru and V0 increases to a positive value. When the $BCl_3$ flow rate decreases, Rd<Ru and V0<0. In operation of the system 1 as hereinafter further described, this negative voltage condition for V0 occurs when a higher-pressure gas such as the $N_2S$, $CH_3F$ or $CF_4$ begins to backfill the $BCl_3$ gas delivery conduit 54 in the direction opposite the normal flow of $BCl_3$, indicated by the arrows in FIG. 3. Accordingly, Rd initially falls below Ru and V0 assumes a negative value.

Figure 4:
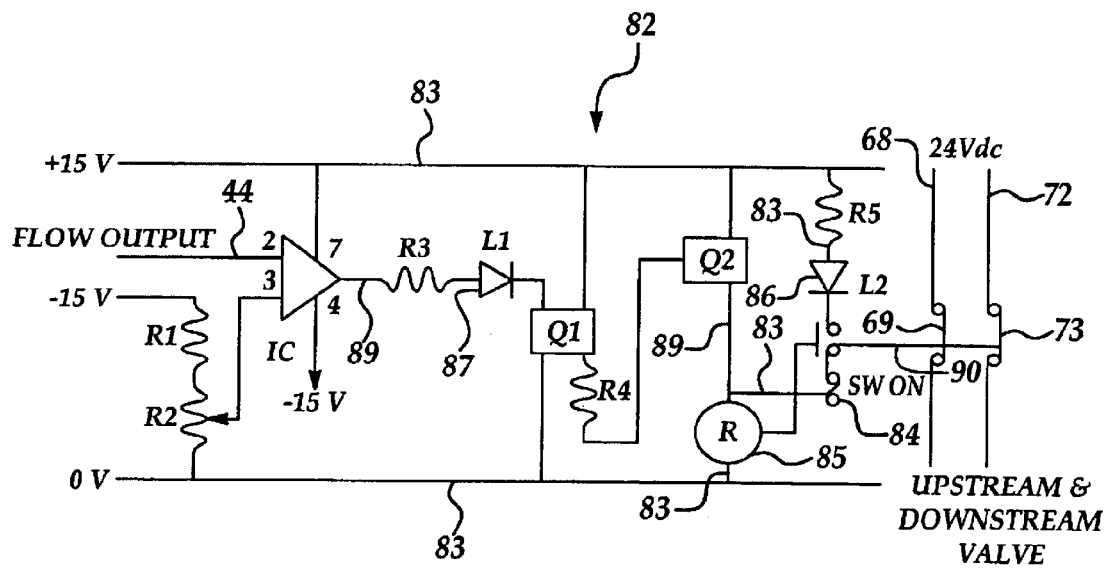
FIG. 4 is a schematic wiring diagram illustrating a typical valve control circuit in implementation of the present invention.

The primary voltage signal lead 42 and the secondary voltage signal lead 43 are connected to a valve control circuit 82, shown in FIG. 4, through voltage signal wiring 44. The valve control circuit 82 typically includes a manual switch 84, a relay 85, a typically yellow LED 86, a typically green LED 87, a first resistor R1 (2.2 K'Ω ½ w), a second resistor R2 (50 K'Ω ½ w), a third resistor R3 (1 K'Ω ½ w), a fourth resistor R4 (33 K'Ω ½ w), and a fifth resistor R5 (220'Ω ½ w). The relay 85 is connected to an upstream valve switch 69 of the upstream valve 68 and to a downstream valve switch 73 of the downstream valve 72 through relay wiring 90. Under circumstances in which no backfilling of $N_2S$, $CH_3F$ or $CF_4$ gas occurs in the $BCl_3$ gas delivery conduit 54, current flows along a primary current path 83 and illuminates the yellow LED 86 to indicate normal conditions in the $BCl_3$ gas delivery conduit 54. Under circumstances in which $N_2S$, $CH_3F$ or $CF_4$ begins to backfill the $BCl_3$ gas delivery conduit 54 in the direction opposite the normal flow of $BCl_3$, indicated by the arrows in FIG. 3, current flows along the secondary current path 89 and illuminates the green LED 87. Simultaneously, the relay 85 switches current flow to the upstream valve switch 69 and downsream valve switch 73, causing these switches to close the normally-open upstream valve 68 and the downstream valve 72, respectively, of the $BCl_3$ gas delivery conduit 54 and thereby halting further backfilling of $N_2S$, $CH_3F$ or $CF_4$ in the $BCl_3$ gas delivery conduit 54.

Referring again to FIGS. 2–4, in application of the backfill prevention system 1, the various gases flow individually into the process chamber 80 through the respective gas delivery conduits 54–58 according to the processing requirements in the process chamber 80. The $BCl_3$ and $Cl_2$ each flows at a pressure of typically about 15 psi, whereas the $N_2S$, the $CH_3F$ and the $CF_4$ each flows at a higher pressure of typically about 35 psi. The upstream valve 68 and the downstream valve 72 of each gas delivery conduit 54–58 remains closed when the corresponding gas is not being distributed to the process chamber 80. For example, as the $BCl_3$ flows through the $BCl_3$ gas delivery conduit 54 to the process chamber 80, both the downstream valve 68 and upstream valve 72 of the $BCl_3$ gas delivery conduit 54 is open while the upstream valve 68 and the downstream valve 72 of each of the remaining gas delivery conduits 55–58 are closed to prevent those respective gases from flowing into the $BCl_3$ gas delivery conduit 54. However, in the event that the higher-pressure $N_2S$, $CH_3F$ or $CF_4$ is introduced into the process chamber 80 prior to introducing the $BCl_3$ into the process chamber 80, residual higher-pressure $N_2S$, $CH_3F$ or $CF_4$ remains in the manifold conduit 74 and backflows through the downstream valve 72 and upstream valve 68 of the $BCl_3$ gas delivery conduit 54. Under normal circumstances, in which the $BCl_3$ flows normally through the gas delivery conduit 54 in the direction indicated by the arrows in FIG. 3, Ru=Rd and V0=0. Accordingly, current flows along the primary current path 83 of the valve control circuit 82 shown in FIG. 4 and illuminates the yellow LED 86 to indicate normal flow of $BCl_3$ through the $BCl_3$ gas delivery conduit 54. In the event that the flow rate of the $BCl_3$ in the $BCl_3$ gas delivery conduit 54 increases, Ru<Rd and V0>0, and current likewise flows along the primary current path 83 of the valve control circuit 82 and illuminates the yellow LED 86 to indicate normal flow of $BCl_3$ through the $BCl_3$ gas delivery conduit 54 .

In the event that residual $N_2S$, $CH_3F$ or $CF_4$ from the manifold conduit 74 begins to backfill the $BCl_3$ gas delivery conduit 54 in the direction opposite the normal flow of $BCl_3$, Rd initially falls below Ru, due to the reverse-flowing residual $N_2S$, $CH_3F$ or $CF_4$ in the $BCl_3$ gas delivery conduit 54. Consequently, V0 assumes a negative value. This negative V0 value is transmitted to the valve control circuit 82 through the voltage signal wiring 44, and current flows through the secondary current path 89 instead of through the primary current path 83. Accordingly, the green LED 87 is illuminated, and this indicates a backfill condition in the $BCl_3$ gas delivery conduit 54. Furthermore, the relay 85 initiates current flow through the switch current path 90, which current actuates the upstream valve switch 69 of the upstream valve 68 and the downsream valve switch 73 of the downstream valve 72 to close the upstream valve 68 and the downstream valve 72 and thus, prevent further backflow of the $N_2S$, $CH_3F$ or $CF_4$ into the $BCl_3$ gas delivery conduit 54.

While the backfill prevention system 1 is heretofore described in conjunction with the $BCl_3$ gas delivery conduit 54, it is understood that the backfill prevention system 1 of the present invention may be used in conjunction with the upstream valve 68 and downstream valve 72 of the $Cl_2$ gas delivery conduit 55, instead of or in addition to the $BCl_3$ gas delivery conduit 54, to prevent backfilling of the $Cl_2$ gas delivery conduit 55 with the $N_2S$, $CH_3F$ or $CF_4$.

While the preferred embodiments of the invention have been described above, it will be recognized and understood that modifications can be made in the invention and the appended claims are intended to cover all such modifications which fall within the spirit and scope of the invention.

Having described our invention with the particularity set forth above, we claim:

1. A system for preventing a gas from backfilling a gas flow conduit, comprising:

at least one valve for reversibly closing the gas flow conduit;

a gas flow monitor circuit for detecting normal flow conditions in the gas flow conduit and backfilling of the gas in the gas flow conduit, and backfilling of the gas in the gas flow conduit, wherein said gas flow monitor circuit comprises an upstream thermal induction coil and a downstream thermal induction coil for detecting mass flow of the gas in the gas flow conduit; and a valve control circuit electrically connected to said gas flow monitor circuit and operably connected to said at least one valve for closing said at least one valve when said gas flow monitor detects said backfilling of the gas in the gas flow conduit.

2. The system of claim 1 wherein said at least one valve comprises a pair of valves.

3. The system of claim 1 further comprising a light emitting diode provided in said valve control circuit for indicating said backfilling of the gas in the gas flow conduit.

4. The system of claim 3 wherein said at least one valve comprises a pair of valves.

5. The system of claim 1 wherein said valve control circuit comprises a primary current path for receiving a current when said gas flow monitor circuit detects said normal flow conditions in the gas flow conduit and a secondary current path for receiving said current when said gas flow monitor circuit, detects said backfilling of the gas in the gas flow conduit, and wherein said light emitting diode is provided in said secondary current path for indicating said backfilling of the gas in the gas flow conduit.

6. The system of claim 5 wherein said at least one valve comprises a pair of valves.

7. The system of claim 5 wherein said gas flow monitor circuit comprises an upstream thermal induction coil and a downstream thermal induction coil for detecting mass flow of the gas in the gas flow conduit.

8. The system of claim 7 wherein said at least one valve comprises a pair of valves.

9. A system for preventing a gas from backfilling a gas flow conduit, comprising:

at least one valve for reversibly closing the gas flow conduit;

a gas flow monitor circuit for detecting normal flow conditions in the gas flow conduit and backfilling of the gas in the gas flow conduit;

a valve control circuit electrically connected to said gas flow monitor circuit and operably connected to said at least one valve for closing said at least one valve when said gas flow monitor circuit detects said backfilling of the gas in the gas flow conduit, said valve control circuit comprising a primary current path for receiving a current when said gas flow monitor circuit detects said normal flow conditions in the gas flow conduit and a secondary current path for receiving said current when said gas flow monitor circuit detects said backfilling of the gas in the gas flow conduit; and a light emitting diode provided in said primary current path for indicating said normal flow conditions in the gas flow conduit.

10. The system of claim 9 further comprising a second light emitting diode provided in said secondary current path for indicating said backfilling of the gas in the gas flow conduit.

11. The system of claim 9 wherein said gas flow monitor circuit comprises an upstream thermal induction coil and a downstream thermal induction coil for detecting mass flow of the gas in the gas flow conduit.

12. The system of claim 11 further comprising a second light emitting diode provided in said secondary current path for indicating said backfilling of the gas in the gas flow conduit.

13. A method of preventing a gas from backfilling a gas flow conduit, comprising the steps of:

providing at least one valve in the gas flow conduit;

providing a gas flow monitor circuit in gas flow measuring contact with the gas flow conduit for detecting normal gas flow conditions and backfilling of the gas in the gas flow conduit;

electrically connecting a valve control circuit having a primary current path and a secondary current path to said gas flow monitor circuit;

operably connecting said valve control circuit to said at least one valve for opening and closing said at least one valve;

transmitting a current from said gas flow monitor circuit through said primary current path and maintaining said at least one valve in an open position when said gas flow monitor circuit detects said normal gas flow conditions in the gas flow conduit; and transmitting said current from said gas flow monitor circuit through said secondary current path and closing said at least one valve when said gas flow monitor circuit detects said backfilling of the gas in the gas flow conduit.

14. The method of claim 13 further comprising the steps of providing a light emitting diode in said primary current path and energizing said light emitting diode when said gas flow monitor detects said normal gas flow conditions in the gas flow conduit and said current flows through said primary current path.

15. The method of claim 13 further comprising the steps of providing a light emitting diode in said secondary current path and energizing said light emitting diode when said gas flow monitor detects said backfilling of the gas in said gas flow conduit and said current flows through said secondary current path.

16. The method of claim 15 further comprising the steps of providing a second light emitting diode in said primary current path and energizing said second light emitting diode when said gas flow monitor detects said normal gas flow conditions in the gas flow conduit and said current flows through said primary current path.

* * * * *